(12) United States Patent
Randall (10) Patent No.: US 7,294,822 B2
(45) Date of Patent: Nov. 13, 2007

(54) METHOD AND APPARATUS TO COMMUNICATE WITH AND INDIVIDUALLY LOCATE MULTIPLE REMOTE DEVICES ON A TWO-DIMENSIONAL SURFACE

(76) Inventor: Mitch Randall, 1695 Denison Cir., Longmont, CO (US) 80503

( * ) Notice: Subject to any disclaimer, the term of this patent is extended or adjusted under 35 U.S.C. 154(b) by 288 days.

(21) Appl. No.: 11/084,706

(22) Filed: Mar. 17, 2005

(65) Prior Publication Data

US 2005/0230609 A1 Oct. 20, 2005

Related U.S. Application Data

(60) Provisional application No. 60/521,249, filed on Mar. 19, 2004.

(51) Int. Cl.
*H01J 40/14* (2006.01)
(52) U.S. Cl. .................................... 250/221; 250/559.4
(58) Field of Classification Search ................ 250/221, 250/559.4, 559.29, 559.34; 356/615, 622, 356/237.3, 237.5, 237.4
See application file for complete search history.

(56) References Cited

U.S. PATENT DOCUMENTS

| | | | |
|---|---|---|---|
| 5,438,518 A | 8/1995 | Bianco et al. | |
| 5,606,174 A | * 2/1997 | Yoshimura et al. | .... 250/559.22 |
| 6,634,959 B2 | 10/2003 | Kuesters | |
| 6,638,173 B2 | 10/2003 | Robinson | |

* cited by examiner

*Primary Examiner*—Que T Le
(74) *Attorney, Agent, or Firm*—Cochran Freund & Young LLC; James R. Young (57) ABSTRACT

A method and apparatus is provided by the invention whereby a base station communicates with and determines the position of multiple remote devices on a two-dimensional surface. In one embodiment the base station employs a single channel radio transmitter, an infrared detector, and an infrared projecting apparatus. The radio transmitter sends a continuous stream of addressed and time-multiplexed commands to the multiple remote devices. The multiple remote devices receive commands and time synchronization from the radio signal. The projecting apparatus is located above the two-dimensional surface and projects an alternating pair of orthogonal, sweeping, infrared, line-shaped, illumination areas upon it with deterministic timing. Each remote device detects the passage of the sweeping infrared line-shaped illumination areas over it. The measured timing is used to derive the two dimensional position aboard the remote device which is then communicated back to the base station by an infrared data link.

12 Claims, 9 Drawing Sheets

FIG. 9 example communications on infrared channel 6

-30 deg
FIG. 7a 0 deg
FIG. 7b 30 deg
FIG. 7c 45 deg
FIG. 7d 60 deg
FIG. 7e 90 deg
FIG. 7f 120 deg
FIG. 7g 135 deg
FIG. 7h

METHOD AND APPARATUS TO COMMUNICATE WITH AND INDIVIDUALLY LOCATE MULTIPLE REMOTE DEVICES ON A TWO-DIMENSIONAL SURFACE

CROSS REFERENCE TO RELATED APPLICATIONS

The present application claims priority to U.S. Provisional Application No. 60/521,249, filed Mar. 19, 2004, said Provisional Application being incorporated herein by reference.

FIELD OF THE INVENTION

The invention relates to the field of communicating with and the locating of multiple remote devices and more specifically to the field of communicating with and locating of multiple remote devices by using a base station that establishes two-way communication with multiple remote devices and determines their individual positions on a two-dimensional surface.

BACKGROUND OF THE INVENTION

Typical positioning determining systems determined the position of objects in the order of feet and meters. For example, GPS is a system that locates objects geographically in longitude and latitude on a scale of tens of feet. There are currently no systems or technology available to allow a central controller to communicate with and determine the position of multiple remote devices in an economical manner and on a small scale, such as would be required for Robotic Gaming for example. The required positioning resolution is, therefore, finer than for many currently available technologies. At the same time, there are advanced position determination systems, however they do not use simple circuitry and widely available components and thus have a high cost.

For a two dimensional platform, position determination systems such as grid-pad systems or touch systems, such as used for stylus or mouse location, are not readily expandable to the task of locating multiple remote devices disposed on the two dimensional platform. Unfortunately, optical systems involving video cameras and array processing are not economical for this application either.

A need therefore exists to provide an economical position determination system for individually locating multiple remote devices on a two-dimensional surface.

SUMMARY OF THE INVENTION

It is therefore an object of the invention to provide a position determination system for locating multiple remote devices on a surface.

It is a further object of the invention to provide such a position determination system that allows for the remote devices to communicate information back to a base station that is used for the position determination.

In accordance with the invention there is provided an economical means of allowing a base station to communicate with and determine the position of multiple remote devices on a two-dimensional surface.

In accordance with the invention there is provided a base station that transmits control and timing information on a single radio channel that is received simultaneously by multiple remote devices.

In accordance with the invention the base station illuminates the two-dimensional surface from overhead with a first narrow, line-shaped pattern of light repetitively sweeping with predetermined timing across the two-dimensional surface in a direction perpendicular to its line shape.

In accordance with the invention the base station illuminates the two-dimensional surface from overhead with a second narrow, line-shaped pattern of light perpendicular to the first line-shaped pattern of light and repetitively sweeping with predetermined timing alternate to the sweep of the first line-shaped pattern of light across the surface of the two-dimensional surface in a direction perpendicular to its own line shape.

In accordance with the invention there is provided a means whereby remote devices detect the time of passage overhead of each of the sweeping line-shaped patterns of illumination, thereby determining their individual x and y location on the two dimensional surface.

In accordance with the invention there is provided a means by which the remote devices communicate their measured locations to the base station.

In accordance with the invention there is provided a method and apparatus, whereby a base station communicates with and determines the position of multiple remote devices on a two-dimensional surface. In one embodiment the base station employs a single channel radio transmitter, an infrared detector, and an infrared projecting apparatus. The radio transmitter sends a continuous stream of addressed and time-multiplexed commands to the multiple remote devices. The multiple remote devices receive commands and time synchronization from the radio signal. The projecting apparatus is located above the two-dimensional surface and projects an alternating pair of orthogonal, sweeping, infrared, line-shaped, illumination areas upon it with deterministic timing. Each remote device detects the passage of the sweeping infrared line-shaped illumination areas over it. The measured timing is used to derive the two dimensional position aboard the remote device which is then communicated back to the base station by an infrared, RF, light, sound, ultrasound, or other data link.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings: Exemplary embodiments of the invention will now be described in conjunction with the following drawings, in which:

DETAILED DESCRIPTION OF THE PREFERRED EMBODIMENTS

Figure 1:
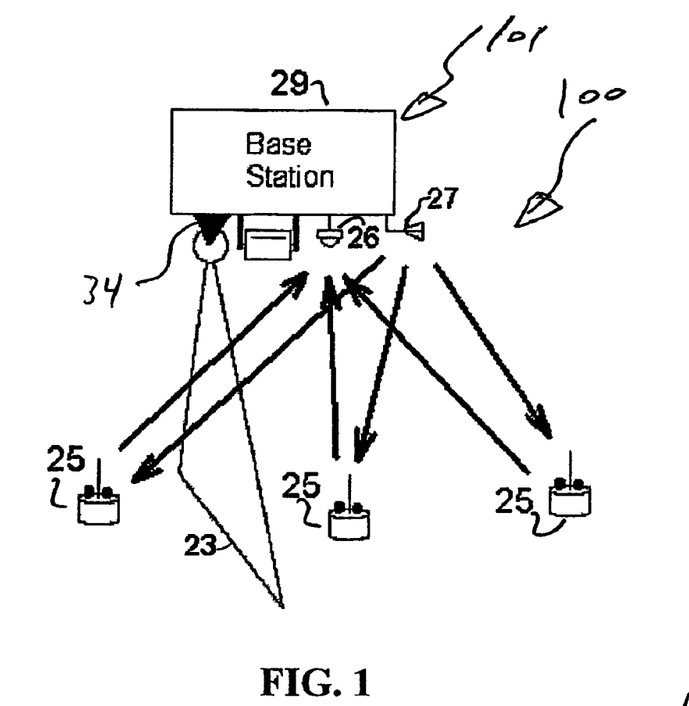
FIG. 1 illustrates simultaneous radio communication signals from a base station to multiple remote devices, the infrared communications from the remote devices back to the base station, and one of two alternating, orthogonal, sweeping, planar fields of infrared illumination that intersects the two-dimensional surface to form a line-shaped illumination area.

FIG. 1 illustrates a gaming platform 100 that utilizes a position determination system 101 in accordance with a preferred embodiment of the invention. The position determination system 101 includes a base station 29, coupled with a RF antenna 27, coupled with a infrared projection apparatus 34 and a base station optical receiver 26, which is preferably in the form of an infrared detector for receiving of a infrared signal having, for example, an approximately 56 kHz carrier frequency. Of course, other light detectors and carrier frequencies can also be used.

Figure 2:
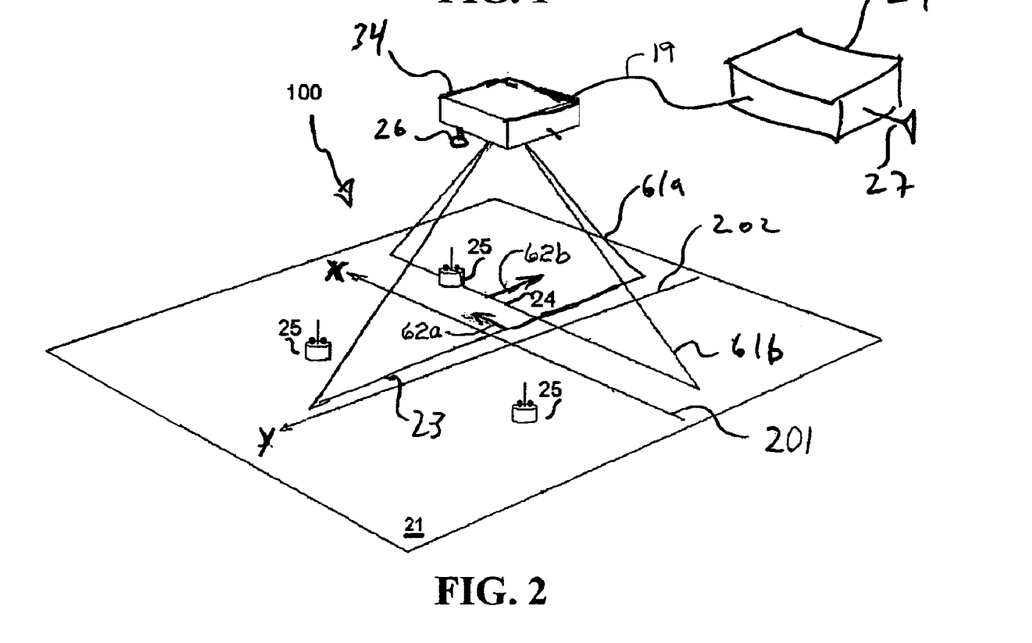
FIG. 2 illustrates a communication and positioning system comprising a base station and remote devices disposed on a two dimensional plane with a Cartesian coordinate system.

Referring to FIG. 2, the infrared projection apparatus 34 and the base station optical receiver 26 are disposed above a substantially planar two-dimensional surface 21 that can be delineated by a Cartesian coordinate system in the plane of the surface 21. Planar or substantially planar for purposes of this invention means flat enough so that the remote devices can move and maneuver on the surface in an acceptable manner for the nature and characteristics of the particular remote devices being used. For example, if the remote devices include toy vehicles, the surface 21 can include toy-sized hills and valleys, obstacles, and the like, and still be considered planar, substantially planar, or two-dimensional according to the terminology used herein.

The base station 29 is electrically coupled with both the base station optical receiver 26 and the infrared projection apparatus 34, as indicated by the electrical connector 19, although other signal transmission and power supply methods and apparatus can be used to provide power and to provide communications between the base station 29 and the infrared projection apparatus 34, as is within the knowledge and capabilities of persons skilled in the art. Preferably, the base station 29 is not disposed above the planar two-dimensional surface 21 but is disposed at a side thereof.

As shown in FIGS. 1 and 2, remote devices 25 are disposed on the substantially planar two-dimensional surface 21 and in view of the base station optical receiver 26 and the infrared projection apparatus 34. The remote devices 25 can be, for example, self-propelled or otherwise moveable game pieces, and they can be either remote controlled or automatically or manually controlled. An X-axis 201 and a Y-axis 202, which is orthogonal to the X-axis 201, are used for defining the Cartesian coordinates for the planar two-dimensional surface 21.

Figure 3:
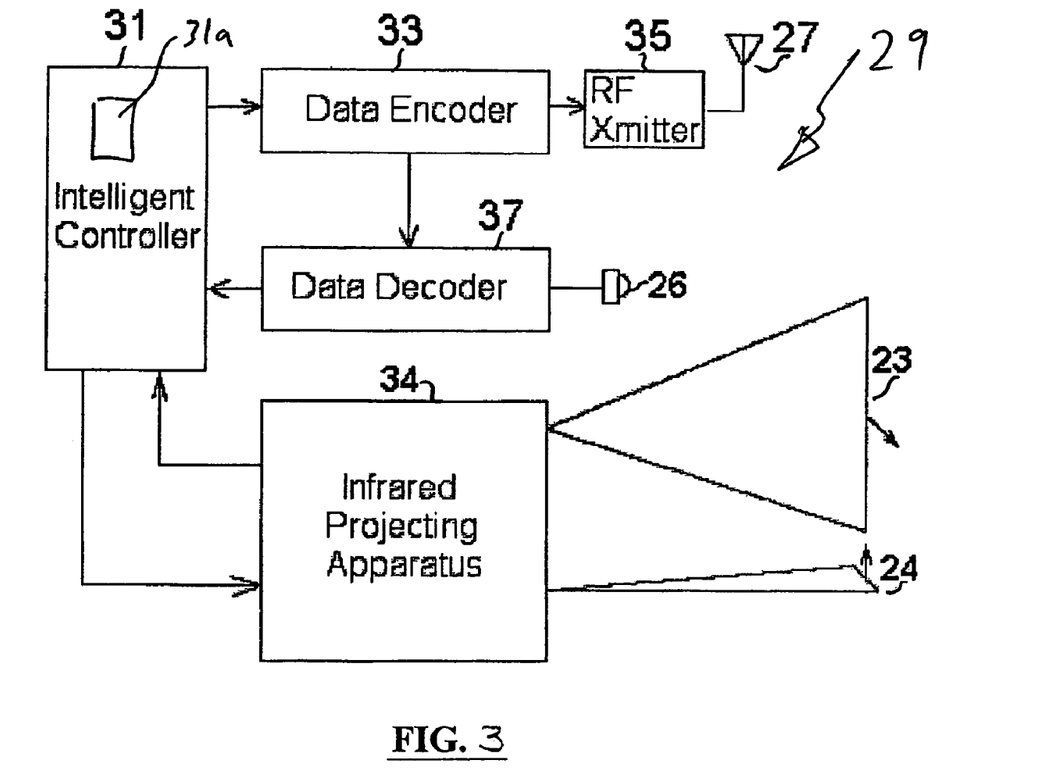
FIG. 3 is a block diagram of the base station comprising an intelligent controller, a data encoder, an RF transmitter, a data decoder, and an infrared projecting apparatus.

FIG. 3 is a block diagram of the base station 29, comprising a base station control circuit 31, a data encoder 33, a RF transmitter 35, the base station optical receiver 26, a data decoder 37 and the infrared projection apparatus 34. The base station control circuit 31 is coupled with the data encoder 33, which is coupled to the RF transmitter 35, which is further coupled with an antenna 27. The optical detector 26 is coupled with the data decoder 37, which is further coupled with the base station control circuit 31. The infrared projection apparatus 34 is also coupled with the base station control circuit 31.

The data encoder 33 is for modulating a radio frequency (RF) carrier with 100% AM modulation by keying the RF transmitter 35 'on' and 'off'. This is also sometimes referred to as on-off keying (OOK). This RF transmission from the base station 29 is then broadcast to all the remote devices 25 using the antenna 27.

The base station control circuit 31 includes a processor (CPU) 31a and is used to generate the RF transmission from the base station 29 to all of the remote devices 25. For the RF transmission from the base station 29, the data encoder circuit 33 receives intended message data from the CPU 31a and converts the intended message to a Manchester pulse code modulated (PCM) serial data stream, which is then transmitted to all the remote devices 25 as the RF transmission from the base station 29. As described herein below, Manchester coding combined with the specific data sequence for the RF transmission from the base station 29 allows for accurate timing synchronization for each of the remote devices 25.

Figure 4:
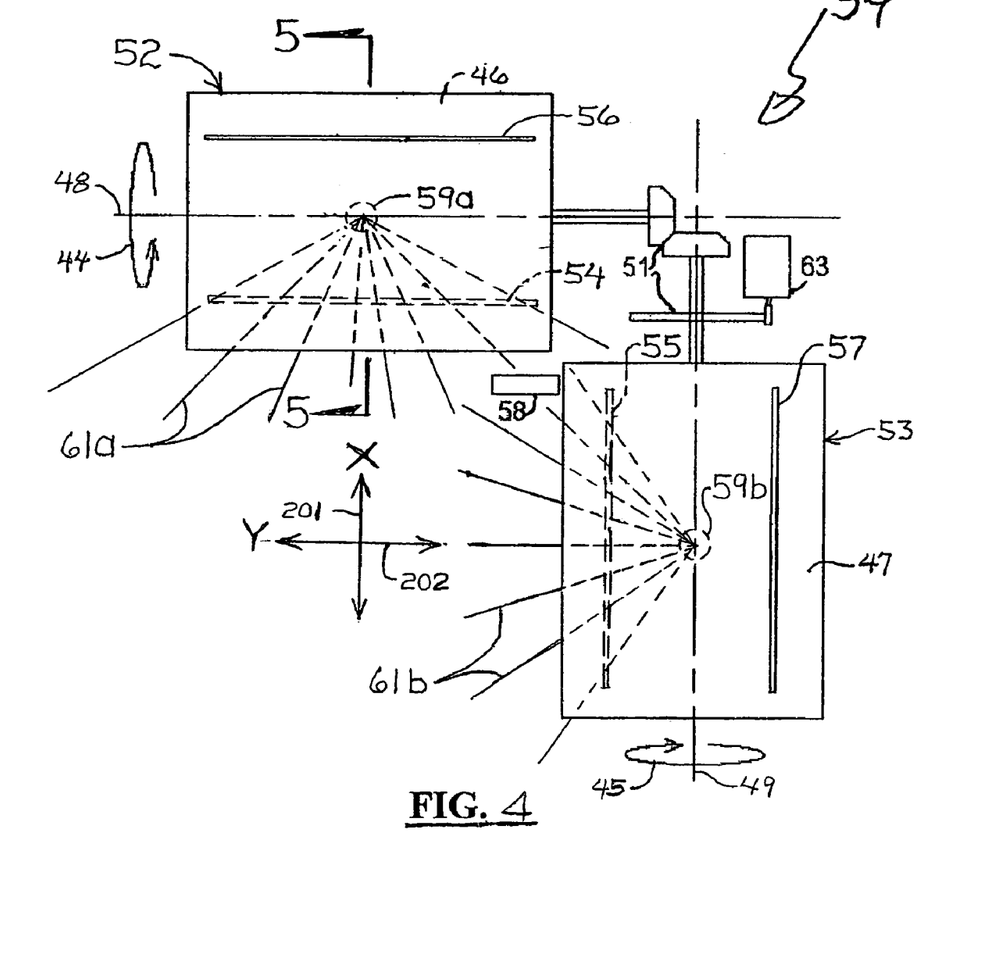
FIG. 4 illustrates two projection drums, the mechanical linkage between them, the motor, a drive assembly, and a position sensor.

FIG. 4 illustrates an exemplary embodiment of the infrared projection apparatus 34. As shown in FIG. 4, the infrared projector apparatus 34 is comprised of two rotatable drums 52, 53 situated with their rotational axes 48, 49, respectively, perpendicular to one-another, and parallel to the plane of the two-dimensional surface 21. The two drums 52, 53 rotate in unison, preferably, but not necessarily, through a bevel gear mechanism 51, and are driven by a motor 63. The base station control circuit 31 synchronizes the rotation of the drums 52, 53 to be in lock step with a data frame rate of the Manchester PCM serial data stream. This synchronization of drums 52, 53 rotation is preferably accomplished through feedback provided by position sensor 58 and control of the speed of the motor 63. The position sensor 58 senses the rotational position of one of the drums, e.g., of drum 53, which can be done by any of a variety of optical or magnetic detectors or other devices that are readily available and well-known to persons skilled in the art. Since the rotational motion of the drums 52, 53 are the same size and shape and are tied together by the bevel gear arrangement 51, only one such sensor 58 is needed to monitor the rotational positions of both drums.

Drum 52 is disposed with its rotational axis 48 parallel to the Y-axis 202, so a light beam 61a emanating from a light source 59a and shining through a slit 54 in the cylindrical drum wall 46 sweeps along, i.e., in the direction of, the X-axis 201. Drum 53 is disposed parallel to the X axis 201, so a light beam 61b emanating from a light source 59b inside drum 53 and shining through a slit 55 in the cylindrical drum wall 47 sweeps along, i.e., in the direction of, the Y axis 202.

Figure 5:
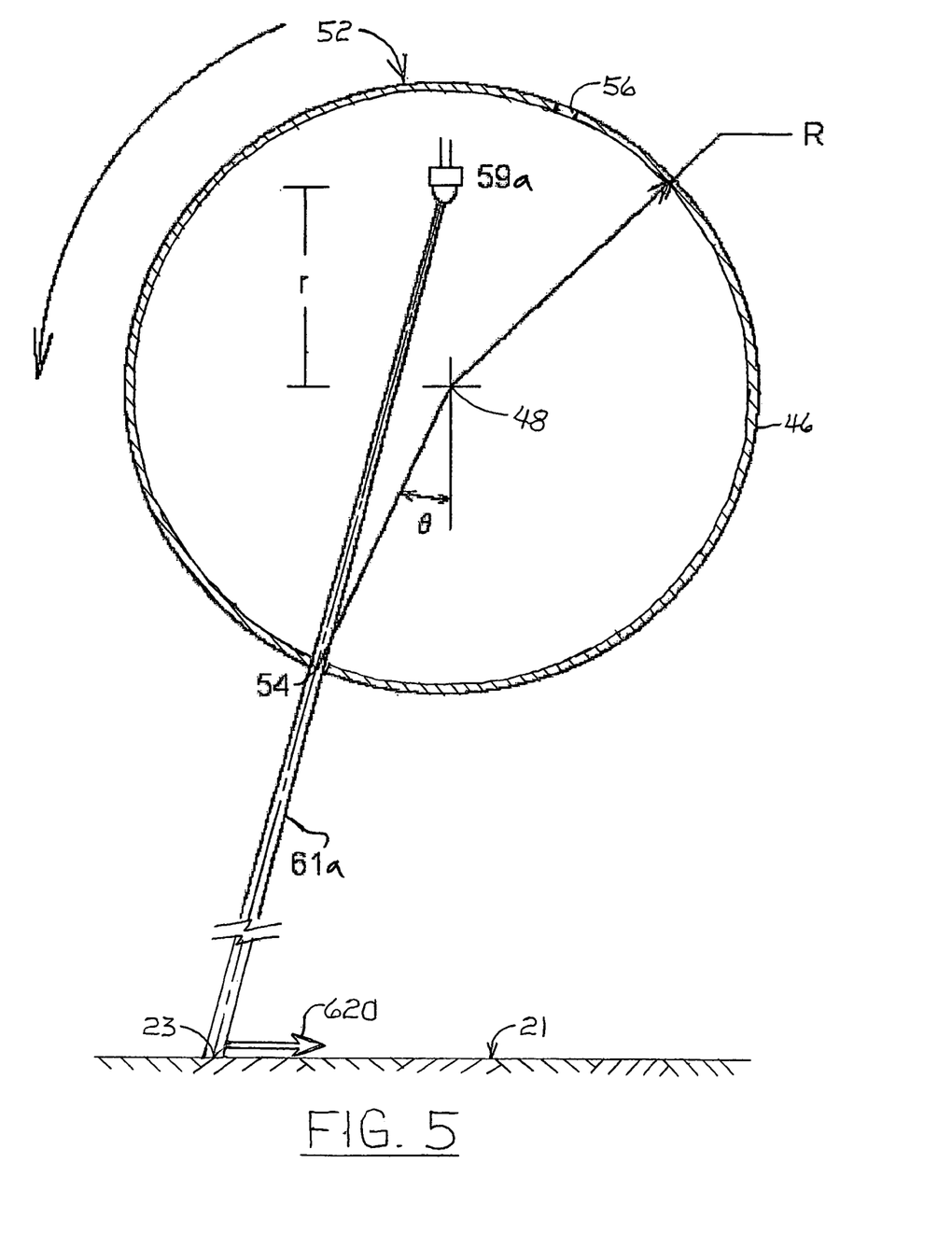
FIG. 5 illustrates the end view of a projection drum with two slits and an infrared emitter.

FIG. 5 is a cross-sectional view of drum 52 taken along section line 5-5 in FIG. 4. Drum 53 is identical to drum 52 and thus the same applies thereto. Each drum 52, 53 includes modulated infrared light source 59a, 59b, respectively, disposed inside the drum. Each infrared light source 59a, 59b is modulated with a continuous wave (CW) carrier frequency of approximately 40 kHz. Each drum 52, 53 has two slits, or longitudinal apertures, e.g., apertures 54, 56 in drum 52 and apertures 55, 57 in drum 53. Each of these elongated apertures or slits 54, 56 and 55, 57 is oriented parallel to the axis of rotation 48, 49 of their respective drums 52, 53. The two slits 54, 56 are disposed diametrically opposite each other in the cylindrical wall 46 of drum 52, i.e., 180 degrees from one another about the circumference of the drum 52. Likewise, the slits 55, 57 are disposed diametrically opposite each other in the cylindrical wall 47 of drum 53. Light from the sources 59a, 59b shines through one of the elongated slits, 54, 56 and 55, 57, in each drum, 52, 53, respectively. Propagation of light from the light source 59a in drum 52 through one of the slits 54, 56 results in a substantially planar beam 61a, which forms an illuminated sweep line 23 (shown in FIG. 2) on the planar surface 21 parallel to the Y-axis 202. As the drum 52 rotates in the direction indicated by the arrow 44 in FIG. 4, the illuminated sweep line 23 (FIG. 2) moves or sweeps in the direction of the X-axis 201, as indicated by arrow 62a in FIG. 2. Propagation of light from the light source 59b through one of the slits 55, 57 in drum 53 results in a substantially planar second beam 61b, which forms an illuminated sweep line 24 (FIG. 2) on the planar surface 21 parallel to the X-axis 201. As the drum 53 rotates in the direction indicated by the arrow 45 in FIG. 4, the illuminated sweep line 24 (FIG. 2) moves or sweeps in the direction of the Y-axis 202, as indicated by arrow 62b in FIG. 2. Therefore, the projection of each of the planar light beams 61a and 61b upon the surface 21 in FIG. 2 results in an elongated, substantially line-shaped area of illumination, i.e., lines of light or lines of illumination on the surface, sometimes also referred to as sweep lines 23, 24 on the surface 21.

Preferably, the infrared projecting apparatus is located at least several diameters of the drums 52, 53 above the two-dimensional surface 21. The mechanism comprising the rotating drums and slits described above is just one example way of producing the sweep lines 23, 24 on the surface 21. Optionally, the slit on each drum could be replaced with a cylindrical lens (not shown) designed to collimate the infrared light in the narrow dimension of each of the planar beams 61a and 61b in order to form the illumination lines 23, 24. Persons skilled in the art can devise many other ways of doing so, such as with rotating or oscillating mirrors, cylindrical lenses, spatial light modulated arrays, and the like, any of which can be used to implement lines of light that sweep across the surface 21 for use in this invention.

Figure 6:
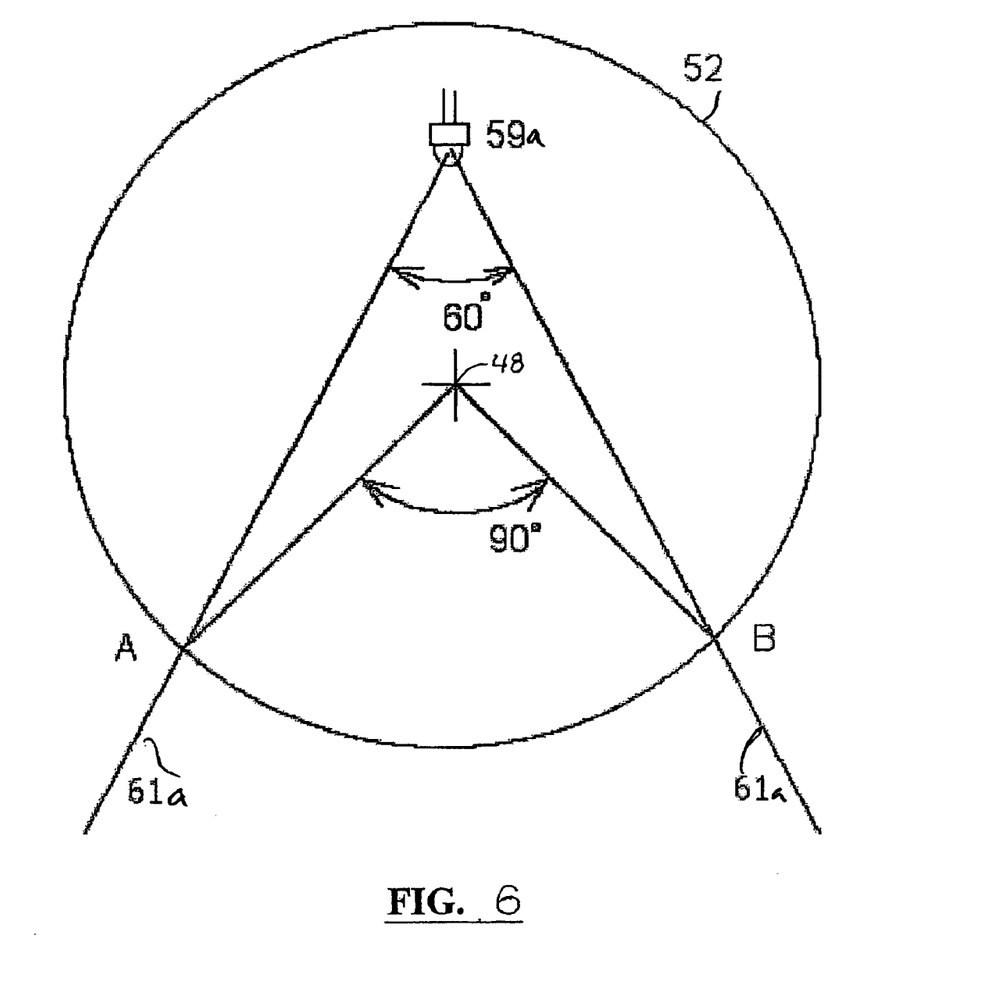
FIG. 6 illustrates the geometrical optics of a projection drum for two superimposed positions of a slit at the extremes of a sweep.

FIG. 6 illustrates the geometrical optics of the extremes for a single X sweep or a single Y sweep denoted by points A and B corresponding to drum 52 (and drum 53), with an angle of +/−45 degrees. The diagram shows both extremes of the sweep in superposition for illustrative purposes only. It is preferred that only one of the planar beams 61a, 61b per axis 201 or 202 is projected onto the surface 21 at any given time. Therefore, only one of the sweep lines 23, 24 is on the surface 21 at a time. However, other implementations in which several sweep lines 23, 24 may be formed on the surface simultaneously can also be used to implement this invention. In the embodiment shown in FIG. 4, the drums 52, 53 are fixed in rotational relation to each other such that the first line-shaped area of illumination 23 preferably sweeps along the X axis 201, and the second line-shaped area of illumination 24 preferably sweeps along the Y axis 202, but at different times. For example, drum 52 and drum 53 may be set by the bevel gear 51 interconnection or by any other synchronizing at a 90-degree rotational off-set from each other so that a sweep line 23 of one drum 52 is just leaving the surface 21 as the sweep line 24 of the other drum 53 is just entering the surface 21 and vice versa.

Figure 7A:
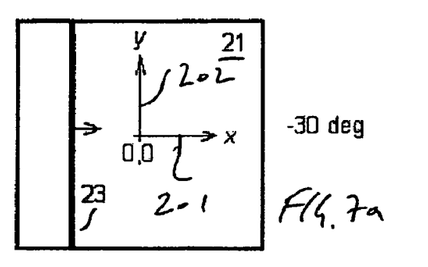
FIGS. 7a through 7h illustrate diagrams of one or more projected line-shaped areas of infrared illumination on the two-dimensional surface for various positions of a projection drum.

FIGS. 7a through 7h illustrate a sequence of images showing the preferred motion of the sweep lines 23, 24 across the two-dimensional surface 21. The images are labeled according to the angular rotation of the respective drum 52 or 53. For reference purposes, FIG. 7a, is labeled as '−30 degrees' and thus it defines a set of coordinate axis and an origin for reference purposes for the two-dimensional surface 21.

Figure 7B:
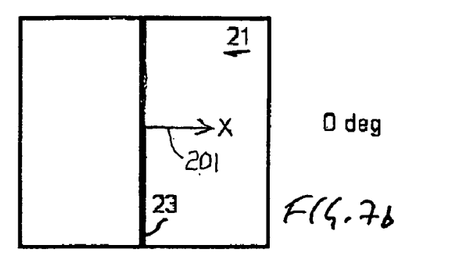
Figure 7C:
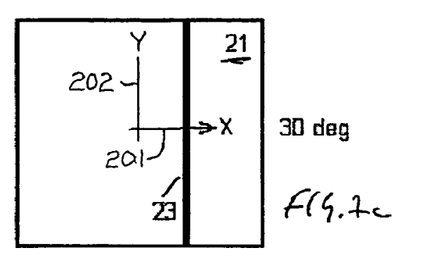
Figure 7D:
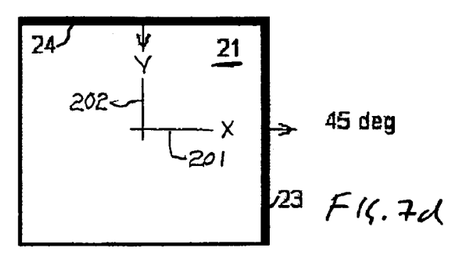
Figure 7E:
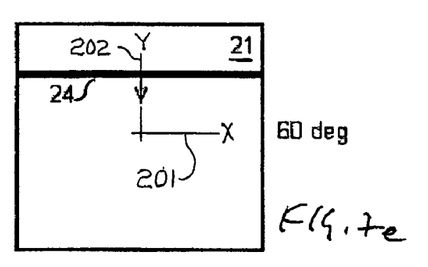
Figure 7F:
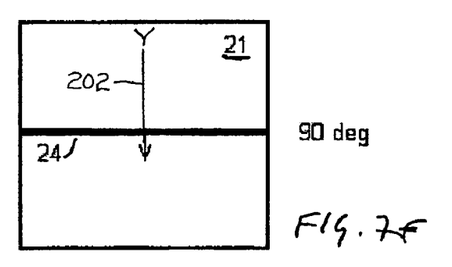
Figure 7G:
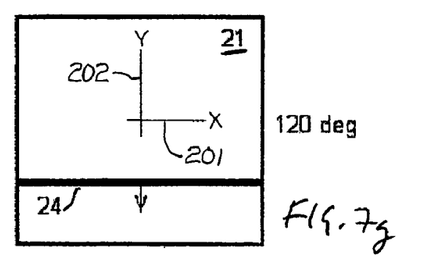
Figure 7H:
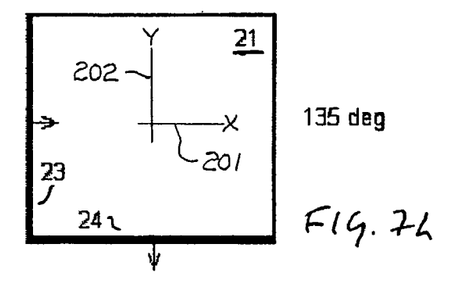

Referring to FIG. 7a, at −30 degrees of drum rotation, sweep line 23 is parallel to the Y-axis and is at a negative value along the X-axis 201. Referring to FIG. 7b, at 0 degrees of drum rotation, sweep line 23 is at position X=0, and as shown in FIG. 7c, sweep line 23 is at a positive X value along the X-axis 201. As shown in FIG. 7d, at 45 degrees of drum rotation, sweep line 23 is at the most positive value of X for the X axis 201 and sweep line 24, which is oriented parallel to the X axis 201, is at the most positive value for the Y axis 202. Referring to FIG. 7e, at 60 degrees of drum rotation, sweep line 23 is no longer illuminating the two-dimensional surface 21, i.e., has moved off surface 21, and sweep line 24 is at a positive value of Y for the Y-axis 202. Referring to FIG. 7f, at 90 degrees of drum rotation, sweep line 24 is at position Y=0. Referring to FIG. 7g, at 120 degrees of drum rotation, sweep line 24 is at a negative value of Y for the Y-axis 202. Referring to FIG. 7h, at 135 degrees of drum rotation, sweep line 24 is at the most negative value of Y for the Y-axis 202 and sweep line 23 is at the most negative value of X for the X-axis 201. Because of the symmetry of the drums 52, 53 and their rotation in unison with each other, the sweep lines repeat scanning with every 180-degree rotation of each drum. As shown in FIG. 7a through 7h, first the sweep along the X-Axis 201 is performed in response to the rotation of drum 53 and then a sweep along the Y-Axis 202 is performed in response to the rotation of drum 52.

The length of the slits, 54, 55, 56, 57, the geometry of their positions and the position of the infrared emitter, 59a and 59b, determine a length of each sweep line, 23 or 24, that is projected onto the two-dimensional surface 21. As illustrated in FIG. 7, during the 90-degree interval of rotation, when one of the slits 54, 55, 56, 57 moves between points A and B, the geometry varies and thus the length of the sweep line, 23 or 24, as it illuminates the two dimensional surface 21, varies. As a design parameter, the length of the slits 54, 55, 56, 57 should be such as to guarantee the minimum length of the sweep line, 23 and 24, that is at least equal to a side length of the two dimensional surface 21. Preferably, for the preferred embodiment the two-dimensional surface is square and is illuminated with same-length sweep lines, 23 and 24.

Preferably, the rotation of the two drums, 52 and 53, is phased with respect to each other, so that, for example, when slit 54 of drum 52 reaches point B in its rotation (+45 degrees), then slit 55 of drum 53 is at point A in its rotation (−45 degrees). This phasing, and the positioning of the slits 54, 55, 56, 57 on the drums, 52 and 53, results in only one of the slits 54, 55, 56, 57 being between points A and B, not inclusive, on their respective drums 52, 53. When one of the drums, 52 or 53, is exactly at point A or B the other of the drums, 52 or 53, is at point B or A, respectively.

One application of the invention may be for use in an indoor location with the two-dimensional surface 21 having an area, for example, as large as 10 feet by 10 feet. Of course, the size of the area is variable and is related to a height of the infrared projection apparatus 34 in relation to the two dimensional surface 21. However, because the infrared transmitters are modulated at approximately 40 Khz and 56 kHz, the invention can also be used outdoors.

Figure 8:
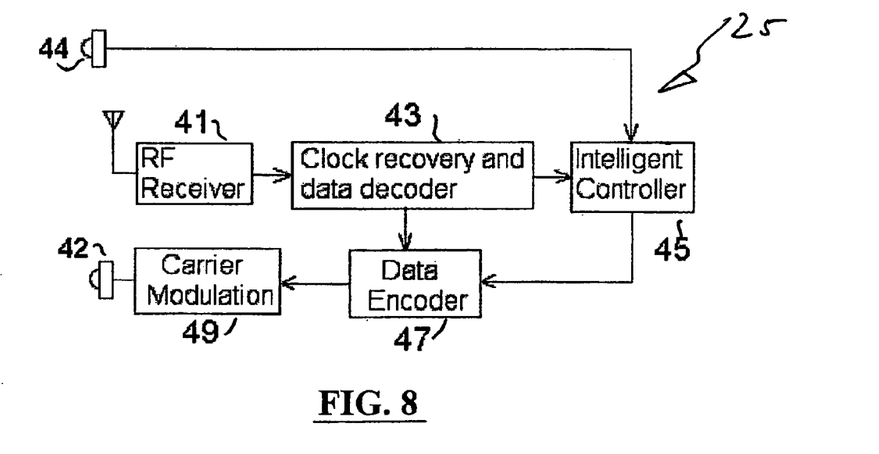
FIG. 8 is a block diagram of a remote device comprising an RF receiver/detector, a clock recovery and data decoder, an intelligent controller, a data encoder, a carrier modulator, an infrared emitter, and an infrared detector.

FIG. 8 illustrates a block diagram of an example circuitry for a remote device 25. In this example, the remote device comprising a RF receiver circuit 41 coupled with a clock recovery and data decoder circuit 43, which is then further coupled with a remote device control circuit 45. The remote device control circuit 45 is coupled with a data encoder circuit 47, which is coupled with a carrier modulator circuit 49 and an infrared emitter 42. An infrared receiver 44 is also provided and coupled with the remote device control circuit 45. Furthermore, the clock recovery and data decoder circuit 43 is coupled with the data encoder circuit 47.

The RF receiver 41 is for receiving of the RF transmission 12 (FIG. 9) from the base station 29 (FIG. 3), transmitted from antenna 27 (FIG. 3). The infrared receiver 44 is for receiving of infrared light emitted from the infrared sources, 59a and 59b (FIG. 4), at approximately a 40 kHz frequency. The infrared emitter 42 is for providing of infrared light to the base station optical detector 26 (FIG. 3), at approximately a 56 kHz frequency. That said, the base station infrared receiver 26 is not sensitive to the carrier frequency of the infrared sources, 59a and 59b.

Preferably, each remote device 25 is pre-assigned its own unique address, such as address values from 0 to 15. A protocol employing both direct addressing and time slot addressing is used so that data between the base station 29 and each remote device 25 is uniquely transmittable therebetween.

Figure 9:
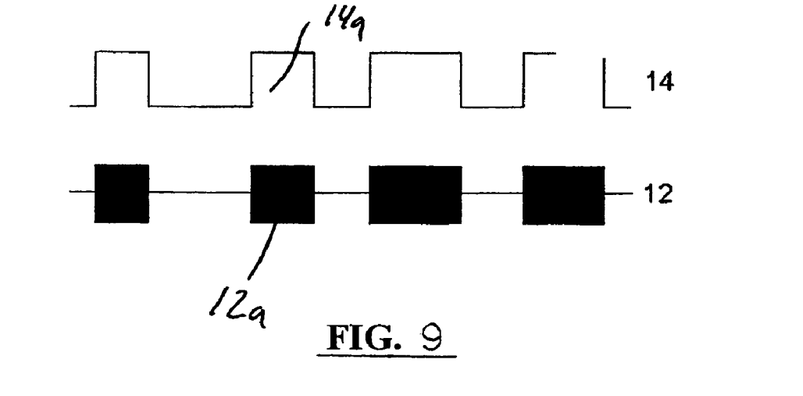
FIG. 9 illustrates a serial data stream and the resulting RF carrier signal transmitted by the base station.

FIG. 9 illustrates a Manchester serial data stream 14 and the resulting RF transmission 12 that is transmitted by the base station 29 to all the remote devices 25 for reception by the RF receiver circuit 41. A digital '1' value 14a in the serial data stream 14 modulates the RF transmission 12 to fully 'ON' 12a and a digital '0' value in the serial data stream 14 modulates the RF transmission 12 to fully 'OFF', as shown.

Each remote device 25 receives and decodes all of the information sent by the base station 29 in the RF transmission 12 from the base station 29 in a frame-by-frame manner. The specific data format used by the base station 29 to communicate with the remote devices 25 is described herein below. Of course, those of skill in the art are aware of many different signal communications protocols and could devise other acceptable formats. Therefore, this description presented herein is just one example and is not intended to limit the present invention to a specific format or protocol. Instead, it is intended to describe a preferred embodiment.

Figure 10:
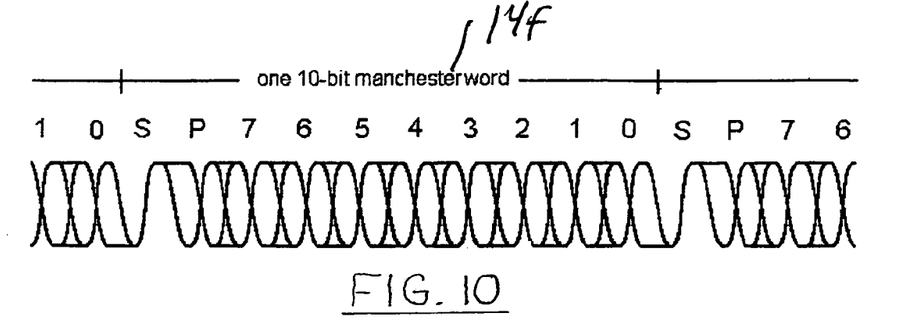
FIG. 10 illustrates the bit format used in each word of the detected Manchester data stream.

FIG. 10 illustrates a bit format that is used for each word 14f of the Manchester serial data stream 14 that is provided as the RF transmission 12 from the base station 29. The information is transmitted in a sequence of serial words, each comprised of 10 bits. Below is a table of the bit definitions in the Manchester serial data stream 14:

| 10 | 9 | 8  | 7  | 6  | 5  | 4  | 3  | 2  | 1  |
|----|---|----|----|----|----|----|----|----|----|
| S  | P | D7 | D6 | D5 | D4 | D3 | D2 | D1 | D0 |

Referring to this table, the column headings 1 through 10 are indicative of a bit position in the Manchester serial stream defined where 1 is the last bit transmitted. D0-D7 represent an 8-bit byte comprising information sent within the Manchester serial stream. P is a parity bit used for error detection, and S is a start bit, which is always set to digital '1' value.

Figure 11:
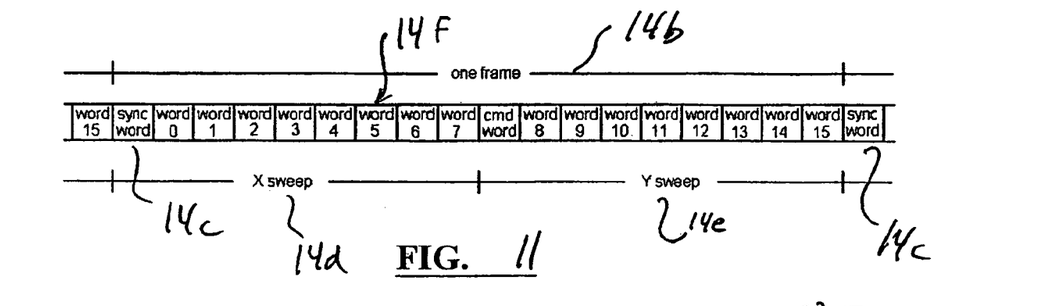
FIG. 11 illustrates the format of a single frame consisting of 18 words.

Referring to FIG. 11, a sequence of eighteen words 14f constitutes a single data frame 14b, which is delineated by a sync word 14c. These data frames 14b serve to establish a measurement interval, a timing reference, and a set of time division multiplexed communication channels for each of the remote devices. In the preferred embodiment, sixteen (16) channels are assigned for a maximum of sixteen remote devices 25, although any other number of devices and associated channels could be used in this invention. The words 14f for a single frame 14b are defined as follows:

| Word (0) | Sync byte |
| Words (1–8) | Data for remote devices 0 to 7 |
| Word (9) | Command byte |
| Word (10–18) | Data for remote devices 8 to 15 |

The words 14f are sent repetitively without gaps such that bit transitions occur regularly in synchronization with a steady clock signal, generated within the base station control circuit 31. Thus, a beginning of each frame, denoted by the sync word 14c, occurs at a steady and predictable rate. Preferably, the duration of each bit is 696 microseconds, the duration of each word 14f is 6.96 milliseconds, and the duration of each data frame 14b is 125.28 milliseconds. The predictable and steady nature of the data stream enables a remote device 25 to generate an internal clock in lock step with the timing of the base station 29 and a local frame sync signal in step with that of the base station 29 to an accuracy of +/–5 microseconds.

Because the RF transmission 12 from the base station 29 is a Manchester PCM serial data stream, clock information is embedded therein. Thus, within each remote device 25, the clock recovery and data decoder circuit 43 (FIG. 8) derives an internal clock signal for the remote device 25 from the RF transmission 12 from the base station 29, which allows for synchronization of the internal clock signal for the remote device 25 with the master clock signal of the base station 29. Furthermore, the receipt of the RF transmission 12 from the base station 29 is used to synchronize to the word 14f boundaries and frame 14b boundaries by the remote device control circuit 45. The synchronization to the frame 14b occurs as a result of the sync word 14c. Upon receipt of the sync word 14c, the remote device control circuit 45 synchronizes itself with the frame 14b. Thus, each remote device 25 is operating with its internal clock and frame sync signal synchronized to the master clock signal.

Within the remote device 25, a locally generated frame sync signal and the locally generated clock signal are used for position determination for each remote device 25 within the two-dimensional planar surface 21. The accuracy in timing of +/−5 microseconds in the measurement of time introduces a negligible error for the positional determination.

A first half 14d of the data frame 14b, labeled 'X sweep', is used to derive an X position along the X-axis 201 for the remote device 25. A second half 14e of the data frame 14b, labeled 'Y sweep', is used to derive a Y position along the Y-axis 202 for the remote device 25. The first half is defined from the beginning of the sync word 14c to the end of word 7. During this time, the line-shaped pattern of illumination 23 emitted from infrared source 59a (FIG. 4), which is parallel to the Y-Axis 202, sweeps in the direction 62a (FIG. 2) from one end of the two-dimensional surface 21 (FIG. 7h) to the other end of the two-dimensional surface 21 (FIG. 7d) in the positive X-direction, as shown in FIGS. 7h, 7a, 7b, 7c and 7d.

For Y position determination for the remote device 25, the second half 14e of the data frame 14b is used. The second half is defined from the beginning of the command word to the end of word 15. During this time, the line-shaped pattern of illumination 24 emitted from infrared source 59b (FIG. 4), which is parallel to the X-Axis 201, sweeps in the direction 62b (FIG. 2) from one end of the two-dimensional surface 21 (FIG. 7d) to the other end of the two-dimensional surface 21 (FIG. 7h) in the negative Y-direction, as shown in FIGS. 7d, 7e, 7f, 7g and 7h.

Each remote device 25 on the surface 21 receives the alternating sweep lines 23, 24 provided by infrared sources 59a and 59b, respectively. Because each remote device 25 is synchronized with the master clock signal and the Manchester frame 14b, it is aware of, i.e., detects, the occurrence of each X sweep and of each Y sweep via its infrared detector 44. A software counter within the remote device control circuit 45 tracks time with respect to the beginning of the X-sweep and Y-sweep intervals. When the remote device 25 detects the passage of an X sweep line 23 or a Y sweep line 24, the value of the software counter is recorded. This recorded value is nearly directly proportional to the position of the remote device on the two-dimensional surface 21. Thus, when the infrared detector 44 becomes energized with light emitted from either of the infrared sources, 59a or 59b, it triggers an event that causes the software counted to stop incrementing. The value of this software counter is then optically provided from the remote device 25, using the infrared transmitter 42, to the base station 29 for receipt by the infrared receiver 26 at the base station 29. Because, each remote device 25 is assigned a unique channel, the base station 29 records this time information for the current remote device 25. At the base station 29, this time is recorded for use in positional determination along one of the axes for the remote device 25.

The remote device controller 45 increments an internal counter over a period of one half of a frame. The counter is reset at the beginning of each half frame as shown in FIG. 11. For the X-axis 201, during the first half 14d of the data frame 14b, the X sweep line 23 sweeps across the two-dimensional surface 21. When the X sweep line 23 passes over a remote device 25 on the surface 21, the infrared detector 44 provides a control signal to the remote device control circuit 45 of that remote device 25 so that it stores the value of the counter. For the Y axis 202, during the second half 14e of the data frame 14b, the Y sweep line 24 sweeps across the two-dimensional surface 21. When the Y sweep line 23 passes over the remote device 25, the infrared detector 44 provides a control signal to that remote device control circuit 45 so that it stores the value of the counter.

Preferably, for example, after a sweep line sweeps along the X-Axis from one end to the other of the two-dimensional surface 21, the time information that is proportional to the X position for the remote device 25 is provided to the base station 29 during the Y sweep period. In this alternating manner, each of the remote devices 25 provides a first time and second time to the base station 29 for use in X-Y coordinate position determination thereof in the time of one frame.

Referring back to FIG. 4, preferably the rotational speed of the drums 52 and 53 is synchronized to the data frame rate of the Manchester signal such that the each of the drums 52 and 53 rotates 90 degrees during one-half of the data frame, 14d and 14e. The phasing of the rotation of the drums 52, 53 is such that during a X sweep or Y sweep, one of the slits 54, 55, 56, 57 for one of the drums, 52 or 53, moves from position A to position B as shown in FIG. 6. Preferably, the infrared light source 59a is positioned in relation to the rotational axis 48 of the drum 52 such that the substantially planar beam 61a sweeps a 60-degree swath for a 90-degree rotation of the drum 52 from position A to position B. In the same manner, it is preferred that the infrared light source 59b in drum 53 be positioned in relation to the rotational axis 49 of the drum 53 such that the beam 61b sweeps a 60-degree swath for a 90-degree rotation of the drum 53. Referring to FIG. 5, this relationship defines the distance 'r' between the rotational axis 48 and the infrared light source 59a as r=0.5176 R, where R is the radius of the drum 52.

Preferably, for each revolution of one of the drum 52, two sweeps of the substantially planar beam 61a between the points A and B occur, which means that two X sweeps of line 23 occur across the surface 21 for each revolution of drum 52. Likewise, each revolution of drum 53 causes two Y sweeps of line 24 to occur across the surface 21. The speed of the motor 63 is maintained so that each of the drums 52, 53 rotates one revolution over the period of two data frames 14b. In the preferred embodiment, the data frame period is 125.28 ms and so the drums 52, 53 rotate once every 250.56 ms corresponding to a rate of 3.991 revolutions per second, or 239.46 RPM. Of course, this invention could also be implemented with one slit per drum or with more than two slits per drum and setting the rotation speed of the drums accordingly, as is well within the capabilities of persons skilled in the art.

The rotation of the two synchronized and phased drums, 52 and 53, and their respective infrared emitters, 59a and 59b, emitting infrared light through slits 54, 55, 56, 57, results in the projection of alternating sweep lines, 23 and 24, onto the two dimensional surface 21 in lock step with the frame rate (FIG. 7). During the period of one data frame 14b, one X line sweep and one Y line sweep occurs, preferably covering the entire two-dimensional surface 21.

Preferably, the RF receiver circuit 41 (FIG. 8) is a single transistor super-regenerative receiver/detector followed by an alternating current (AC) amplifier. An AC coupled amplifier is preferably used because the Manchester serial data stream 12 contains no DC component. However, it should be understood that other types of RF receivers could be used.

The infrared emitter 42 is used to transmit data from the remote device 25 back to the base station 29. Data words generated by the remote device control circuit 45 are converted to a synchronous serial non-return to zero (NRZ) data stream 1401 by the data encoder circuit 47. The NRZ stream 1401 modulates a carrier signal with on-off keying (OOK). Preferably, the carrier frequency and infrared wavelength for the infrared sources, 59a and 59b, is chosen to be compatible with inexpensive, readily available infrared detectors for use as optical receiver 26. The frame timing described above is used to simplify the infrared NRZ communication. The NRZ data bits are defined as follows:

| 10 | 9  | 8  | 7  | 6  | 5  | 4  | 3  | 2  | 1  |
|----|----|----|----|----|----|----|----|----|----|
| P  | D8 | D7 | D6 | D5 | D4 | D3 | D2 | D1 | D0 |

The column headings 1 through 10 above indicate the bit position in the NRZ serial stream 1401, where 1 is the last bit transmitted. Bits D0-D8 constitute a 9-bit data word while bit 10 is used for parity.

Figure 12:
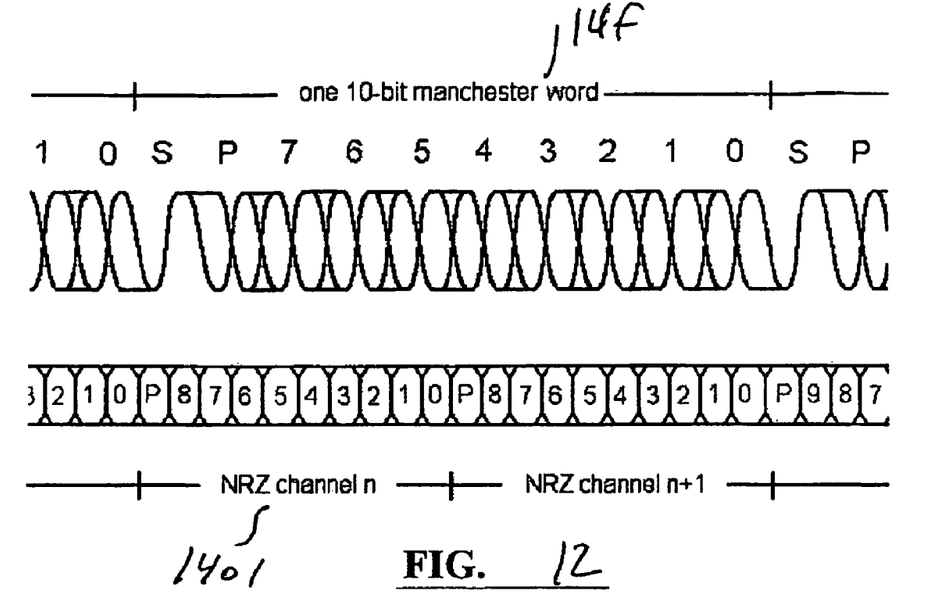
FIG. 12 illustrates the relationship between one 10-bit Manchester word and two synchronous NRZ words.

The timing of the NRZ data word 1401 is shown in FIG. 12. This format is synchronized in time to the one ten bit Manchester word 14f. However each 10-bit NRZ word 1401 transmits in half the time of each 10-bit Manchester word 14f. The time synchronization simplifies the data format by allowing for the use of a synchronous NRZ serial format that contains no start or stop bits.

Figure 13:
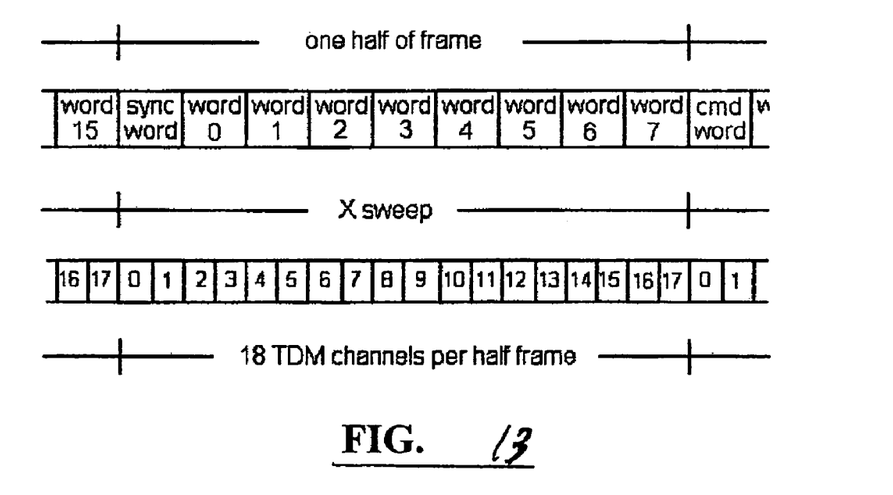
FIG. 13 illustrates the relationship between one half of a frame and the eighteen synchronous NRZ words.
Figure 14:
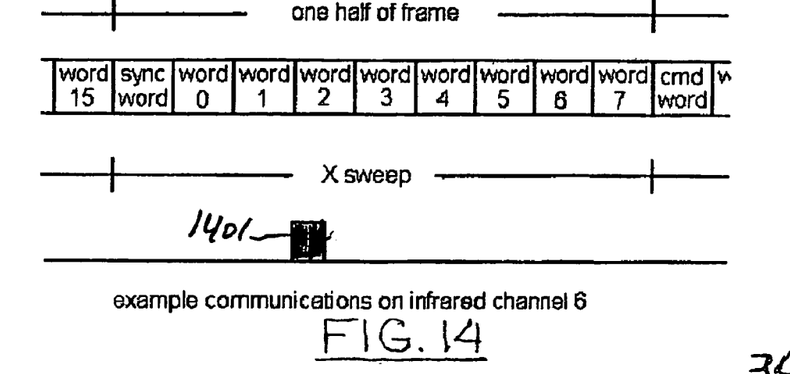
FIG. 14 illustrates an example of a transmission on synchronous infrared NRZ channel 6.

Time data, for position determination, and optionally other data from the multiple remote devices 25 is time division multiplexed (TDM) to provide, for example, eighteen (18) independent channels of communication to the base station 29. The eighteen channels are multiplexed within each half of a data frame 14d, 14e as shown in FIG. 13. This allows each remote device 25 to report a 9-bit word to the base station 29, that has encoded therein time information for use in position determination, for each of the X sweep 14d and Y sweep 14e periods of a single data frame 14b. For example, FIG. 14 illustrates an example of infrared communications 1401 on channel 6 from a remote device 25 back to the base station 29. Odd parity is used so that if transmissions are absent in a given time slot, a parity error will result. This parity result is indicative of absence or blockage of a remote device 25 assigned to that channel.

Figure 15:
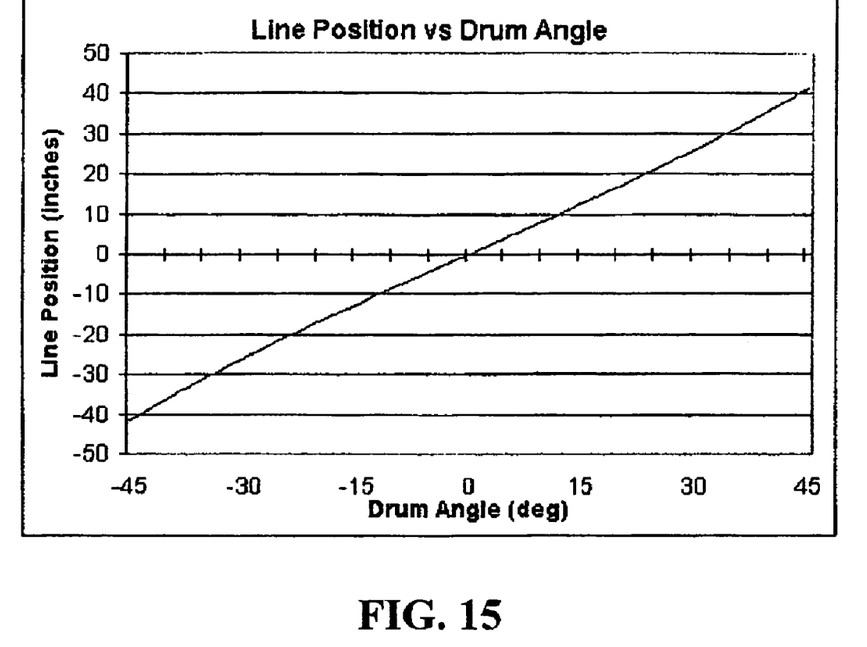
FIG. 15 illustrates a graph of the projected line position along the two-dimensional surface versus the angle of a projection drum; and, FIG. 16 illustrates a graph of the differential error in measurement versus the angle of a projection drum.

In the preferred embodiment, rate of rotation of the drums, 52 and 53, is kept constant within each frame 14b. Because of the geometry of the system, the position of the sweep lines, 23 and 24, does not progress across the two-dimensional surface 21 linearly with respect to time. The position of the sweep lines, 23 and 24, on the two-dimensional surface 21 is shown in FIG. 15 as a function of drum angle θ (see FIG. 5) for the drums, 52 and 53. In this example, the infrared projecting apparatus 34 is located 72 inches above the two-dimensional surface 21. In this case the absolute positional accuracy of a given axis is 0.685 inches RMS over a range of 83 inches (+/−41.5 inches). The two-dimensional RMS positioning error is 1.324 inches RMS over a square measurement area 83 inches on a side.

Figure 16:
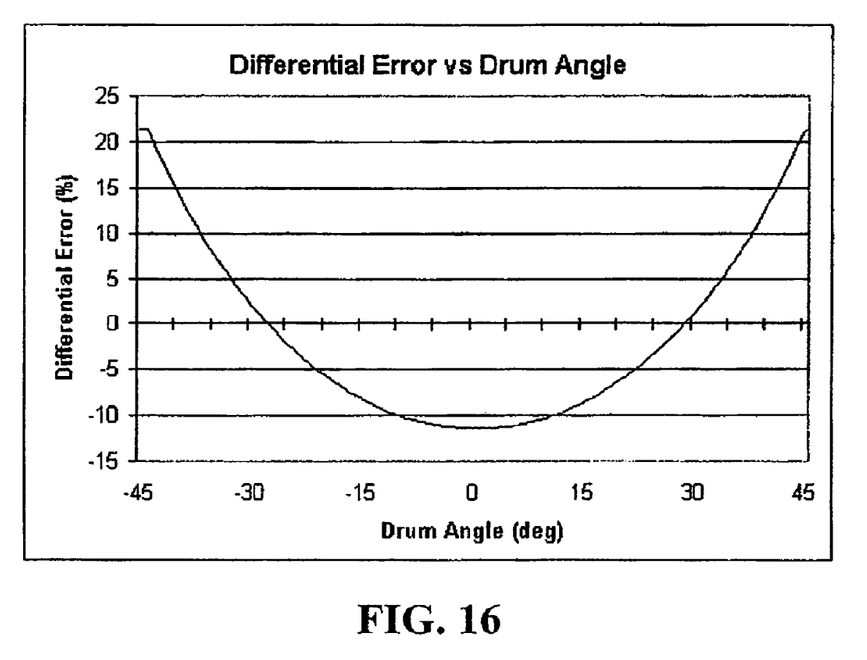

The differential positioning error is shown in FIG. 16. Differential positioning error is the error, in percent, in measuring a slight positional translation at a given location of the remote device 25 in relation to the angle of the drum, 52 and 53, in degrees. Quantitatively the differential positioning error in this case is 10.0% RMS.

With respect to the preferred embodiment, a positional resolution of +/−0.125 inches is achievable over a square area having 72 inches on each side for the two-dimensional surface 21.

Preferably the geometry of the drums and optics used to generate the sweeping line is similar to the geometry described in U.S. patent application Ser. No. 10/613,915 entitled "Method and Apparatus for Producing Ambulatory Motion," incorporated herein by reference. In this patent application, optimum numerical ratios are given for this geometry that minimize linearity errors. Referring to FIG. 5, in the preferred embodiment it is possible to decrease the linearity error by increasing the distance "r" of the infrared source 59a and 59b from the rotational axis of the drum. As the distance r increases, it more closely approximates the optimum result as described in the aforementioned patent application. However, this comes at the expense of a reduction in the total sweep angle covered during the 90-degree rotation of a slit 54, 56 and 55, 57 from point A to point B as shown in FIG. 6.

Preferably the wavelength and modulation frequency of the modulated infrared sources 59a, 59b and the frequency of the infrared receivers 26 and 44, is chosen such as to allow the use of sensitive and inexpensive infrared modules.

In a variation on the preferred embodiment, the speed of the motor 63 is adjusted through proportional control of the drive voltage as part of a phase-locked loop. The loop servos the motor 63 drive in order to match the position sensor 58 signal to the frame rate and phase. In another variation, the motor 63 is a stepper motor and its speed is inherently synchronized to the drive signals generated by the base station control circuit 31.

Optionally, a position sensor 58, in the form of for example a photo interrupter optical switch, is disposed within the infrared projecting apparatus for providing a feedback signal to allow the motion of the sweep lines, 23 and 24, to be synchronized to the processes of the base station control circuit 31. In this case, the position sensor 58 provides an index signal indicating the drum 52, 53 is in a particular position. The RF data signal for transmission is then preferably synchronized to this index signal.

Numerous other embodiments may be envisaged without departing from the spirit or scope of the invention.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A method for determining a position of a device on a two-dimensional surface, comprising:

sweeping a first elongated line of light in a first direction across the surface in a manner that illuminates the device on the surface as the first elongated line of light moves over the device;

monitoring where the first line of light is located on the surface on a real time basis;

detecting the light that illuminates the device as the first elongated line of light sweeps across the surface and correlating timing of such detection of light with the position of the first elongated line of light at the time the light illuminating the device is detected to determine a first direction coordinate position of the device on the surface;

sweeping a second elongated line of light in a second direction across the surface in a manner that illuminates the device on the surface as the second elongated line of light moves over the device;

monitoring where the second line of light is located on the surface on a real time basis; and detecting the light that illuminates the device as the second elongated line of light sweeps across the surface and correlating timing of such detection of light with the position of the second elongated line of light at the time the light illuminating the device is detected to determine a second direction coordinate position of the device on the surface.

2. The method of claim 1, wherein the first direction and the second direction are orthogonal to each other.

3. The method of claim 2, wherein the first direction coordinate an X value and the second direction coordinate is a Y value.

4. Apparatus for detecting a position of a device on a surface, comprising:

a light detector on the device;

means for producing and sweeping a first line of light in a first direction across said surface;

means for producing and sweeping a second line of light in a second direction across said surface;

means for monitoring positions of the first line of light on the surface in real time as the first line of light sweeps across the surface;

means for monitoring positions of the second line of light on the surface in real time as the second line of light sweeps across the surface;

means for correlating time of detection of light by the light detector on the device with the position of the first line of light on the surface at that time for a first direction coordinate of the position of the device on the surface or with the position of the second line of light on the surface at that time for a second direction coordinate of the position of the device on the surface.

5. The apparatus of claim 4, wherein said means for producing and sweeping a first line of light in a first direction across said surface includes:

a rotatable drum that is rotatable about a longitudinal axis of rotation and having a cylindrical wall with an elongated slot oriented parallel to the longitudinal axis of rotation positioned at a distance from the surface;

a light source positioned in the drum; and a drive mechanism connected to the drum that rotates the drum in relation to the surface.

6. The apparatus of claim 5, wherein said means for producing and sweeping a second line of light in a second direction across said surface includes:

a rotatable drum that is rotatable about a longitudinal axis of rotation and having a cylindrical wall with an elongated slot oriented parallel to the longitudinal axis of rotation positioned at a distance from the surface.

7. The apparatus of claim 5, wherein said means for producing and sweeping a first line of light in a first direction across said surface includes:

a rotatable drum that is rotatable about a longitudinal axis of rotation and having a cylindrical wall with an elongated cylindrical lens oriented parallel to the longitudinal axis of rotation positioned at a distance from the surface;

a light source positioned in the drum; and a drive mechanism connected to the drum that rotates the drum in relation to the surface.

8. The apparatus of claim 4, wherein said means for producing and sweeping a second line of light in a second direction across said surface includes:

a rotatable drum that is rotatable about a longitudinal axis of rotation and having a cylindrical wall with an elongated cylindrical lens oriented parallel to the longitudinal axis of rotation positioned at a distance from the surface.

9. The apparatus of claim 4, wherein said means for producing and sweeping a first line of light in a first direction across said surface includes:

a rotating mirror positioned at a distance from the surface and that rotates about an axis of rotation that is parallel to the surface; and a light source adjacent the rotating mirror and oriented to direct a line of light on the mirror.

10. The apparatus of claim 4, wherein said means for producing and sweeping a first line of light in a first direction across said surface includes:

an oscillating mirror positioned at a distance from the surface and that oscillates about an axis that is parallel to the surface; and a light source adjacent the oscillating mirror and oriented to direct a line of light on the mirror.

11. The apparatus of claim 10, wherein the light source directs the line of light on the mirror intermittently.

12. The apparatus of claim 4, wherein said means for producing and sweeping a first line of light in a first direction across aid surface includes:

a spatial light modulator array positioned at a distance from the surface;

a light source adjacent the spatial light modulator and oriented to direct a beam of light on the spatial light modulator; and a control circuit connected to the spatial light modulator programmed to drive the spatial light modulator to direct a sequence of lines of light on the surface to simulate the line of light sweeping across the surface.

* * * * *